United States Patent
Uehara (10) Patent No.: US 10,651,692 B2
(45) Date of Patent: May 12, 2020

(54) POWER TRANSMISSION DEVICE, POWER RECEPTION DEVICE, POWER SUPPLY SYSTEM, AND POWER TRANSMISSION METHOD

(71) Applicant: LAPIS Semiconductor Co., Ltd., Yokohama (JP)

(72) Inventor: Teruaki Uehara, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 218 days.

(21) Appl. No.: 15/686,132

(22) Filed: Aug. 24, 2017

(65) Prior Publication Data

US 2018/0062453 A1  Mar. 1, 2018

(30) Foreign Application Priority Data

Aug. 25, 2016  (JP) .................................. 2016-164419

(51) Int. Cl.
*H02J 50/80* (2016.01)
*H02J 50/10* (2016.01)
*H02J 7/02* (2016.01)
*H04B 5/00* (2006.01)

(52) U.S. Cl.
CPC .............. *H02J 50/80* (2016.02); *H02J 7/025* (2013.01); *H02J 50/10* (2016.02); *H04B 5/0037* (2013.01)

(58) Field of Classification Search
CPC ................................... H02J 50/00; H04B 5/00
USPC ........................................................ 307/104
See application file for complete search history.

(56) References Cited

U.S. PATENT DOCUMENTS

| | | | | |
|---|---|---|---|---|
| 2010/0311327 A1* | 12/2010 | Hamada | ................... | H02J 7/025 455/41.1 |
| 2011/0034124 A1* | 2/2011 | Shiota | ................... | G06K 7/0008 455/41.1 |
| 2012/0007733 A1* | 1/2012 | Cho | ................... | H04W 52/0261 340/539.3 |
| 2015/0065052 A1* | 3/2015 | Heo | ....................... | H04W 76/14 455/41.2 |

(Continued)

FOREIGN PATENT DOCUMENTS

JP  2009-253649 A  10/2009

*Primary Examiner* — Hal Kaplan
*Assistant Examiner* — Joseph N Inge
(74) *Attorney, Agent, or Firm* — Rabin & Berdo, P.C.

(57) ABSTRACT

A power transmission device includes a communication module for transmitting and receiving a power transmission packet, which is an information packet related to the settings of the power transmission, and a general packet, which is an information packet other than the power transmission packet, to and from the power reception device; and a power transmission module for performing the power transmission after transmission and reception of the power transmission packet. The communication module receives address information indicating an address configuration of the memory from the power reception device; provides the general packet with address designation indicating a first memory area, and provides the power transmission packet with address designation indicating a second memory area, on the basis of the address information; and transmits the general packet and the power transmission packet having the address designation to the power reception device.

6 Claims, 7 Drawing Sheets

(56) References Cited

U.S. PATENT DOCUMENTS

2015/0264732 A1* 9/2015 Satoh .................. H04W 76/14
455/41.1

* cited by examiner

POWER TRANSMISSION DEVICE, POWER RECEPTION DEVICE, POWER SUPPLY SYSTEM, AND POWER TRANSMISSION METHOD

BACKGROUND OF THE INVENTION

1. Field of the Invention

The present invention relates to a power transmission device, a power reception device, a power supply system, and a power transmission method.

2. Description of the Related Art

In recent years, short range radio communications by NFC (Near Field Communications) are in widespread use. Using the short range radio communications, power supply systems that supply power (transmit power) in a non-contact manner are studied. Such a power supply system is constituted of a power transmission device and a power reception device, which include information transmission means and non-contact power transmission means to perform information transmission and power transmission by the short range radio communications.

To maintain communication quality, the information transmission means and the power transmission means operate in an exclusive manner. However, when the exclusive control takes the form of disabling starting of operation of one of the means as long as the other operates, even if a battery is exhausted during information transmission, charging of the battery is not started immediately, thus interfering with stable operation of the communication device. Therefore, there is proposed a communication device in which information transmission is performed in a time sharing manner, and a sleep period, except for an active period for performing a radio communication process, is assigned as a power supply period, in order to automatically perform the exclusive control between the radio communication process and the charging process (for example, Patent Document 1: Japanese Patent Application Laid-Open No. 2009-253649).

The power reception device can exchange general information with PCs, as well as exchange information for power supply control with the power transmission device. For example, when a watch that automatically stores positional information as a terminal device (or a power reception device) and a device connected to a PC functions as a battery charger (or a power transmission device), there is conceivable an instance where the PC captures the positional information from the watch, while the battery charger charges up the watch.

In such an instance, to capture the positional information from the watch into the PC after a while from the start of charging, the general information is exchanged after the battery charging is forcefully suspended. After that, charging control information including certification and the like is exchanged again, and thereafter the battery charging is restarted. This causes a reduction in power transmission efficiency and an increase in substantial charging time. Since the general information cannot be exchanged during the exchange of the charging control information, initialization is required to be performed after waiting for a certain time period, thus causing an increase in a reaction time for information exchange.

To solve the problem described above, the present invention has an object to provide a power supply system that can exchange information without a reduction in power transmission efficiency.

SUMMARY OF THE INVENTION

According to one aspect of the present invention, a power transmission device has a power transmission coil, and performs transmission and reception of information packets to and from a power reception device having a power reception coil and a memory, while switching between the transmission and reception of the information packets. The power transmission device includes: a communication module for transmitting and receiving a power transmission packet, which is an information packet related to the settings of the power transmission, and a general packet, which is an information packet other than the power transmission packet, to and from the power reception device; and a power transmission module for performing the power transmission after the transmission and reception of the power transmission packet. The communication module receives address information indicating an address configuration of the memory from the power reception device; provides the general packet with address designation indicating a first memory area of the memory, and provides the power transmission packet with address designation indicating a second memory area of the memory, on the basis of the address information; and transmits the general packet and the power transmission packet having the address designation to the power reception device.

According to another aspect of the present invention, a power reception device has a power reception coil and a memory, and performs transmission and reception of information packets to and from a power transmission device having a power transmission coil, while switching between the transmission and reception of the information packets, in order to charge a battery with received power. The power reception device includes: a communication module for receiving the information packet from the power transmission device; a packet processing module for processing the information packet in a memory area of the memory; a power reception module for receiving power and charging the battery with the received power; and a switch for switching between the communication module and the power reception module, to connect the power reception coil to one of the communication module and the power reception module. The communication module transmits address information indicating an address configuration of the memory to the power transmission device. The packet processing module makes a distinction of the information packet between a power transmission packet, which is an information packet related to the settings of the power transmission, and a general packet, which is an information packet other than the power transmission packet, on the basis of address designation provided to the information packet. The packet processing module processes the general packet in a first memory area of the memory, and processes the power transmission packet in a second memory area of the memory.

According to still another aspect of the present invention, a power supply system includes a power transmission device having a power transmission coil and a power reception device having a power reception coil and a memory. The power supply system performs transmission and reception of information packets between the power transmission coil and the power reception coil, while switching between the transmission and reception of the information packets. The power transmission device includes: a power transmission side communication module for performing the transmission and reception of the information packets; and a power transmission module for performing the power supply. The power reception device includes: a power reception side communication module for performing the transmission and reception of the information packets; a packet processing module for processing the information packet in a memory area of the memory; and a power reception module for charging a battery with power received from the power transmission device. The power reception side communication module of the power reception device transmits address information indicating an address configuration of the memory to the power transmission device. The power transmission side communication module of the power transmission device provides a power transmission packet, which is an information packet related to the settings of the power transmission, with address designation to designate a second memory area of the memory, and provides a general packet, which is an information packet other than the power transmission packet, with address designation to designate a first memory area of the memory, on the basis of the address information. The packet processing module of the power reception device makes a distinction of the information packet received by the power reception side communication module between the power transmission packet and the general packet on the basis of the address designation, and processes the general packet in the first memory area and processes the power transmission packet in the second memory area.

According to further another aspect of the present invention, a power transmission method is a power transmission method for a power transmission device that includes a power transmission coil, a communication module, and a power transmission module. The power transmission device performs transmission and reception of information packets to and from a power reception device having a power reception coil and a memory, while switching between the transmission and reception of the information packets. The communication module performs the steps of receiving address information indicating an address configuration of the memory from the power reception device; providing a power transmission packet, which is an information packet related to the settings of the power transmission, with address designation to designate a second memory area of the memory, and providing a general packet, which is an information packet other than the power transmission packet, with address designation to designate a first memory area of the memory, on the basis of the address information; and transmitting the general packet and the power transmission packet having the address designation to the power reception device. The power transmission module performs the step of performing the power transmission, after the transmission and reception of the power transmission packets.

The present invention allows information exchange without a reduction in power transmission efficiency.

DETAILED DESCRIPTION OF THE INVENTION

Embodiments of the present invention will be described below in detail with reference to the drawings. In the description and attached drawings of each of the following embodiments, substantially equal or equivalent components are denoted by the same reference numerals.

First Embodiment

Figure 1:
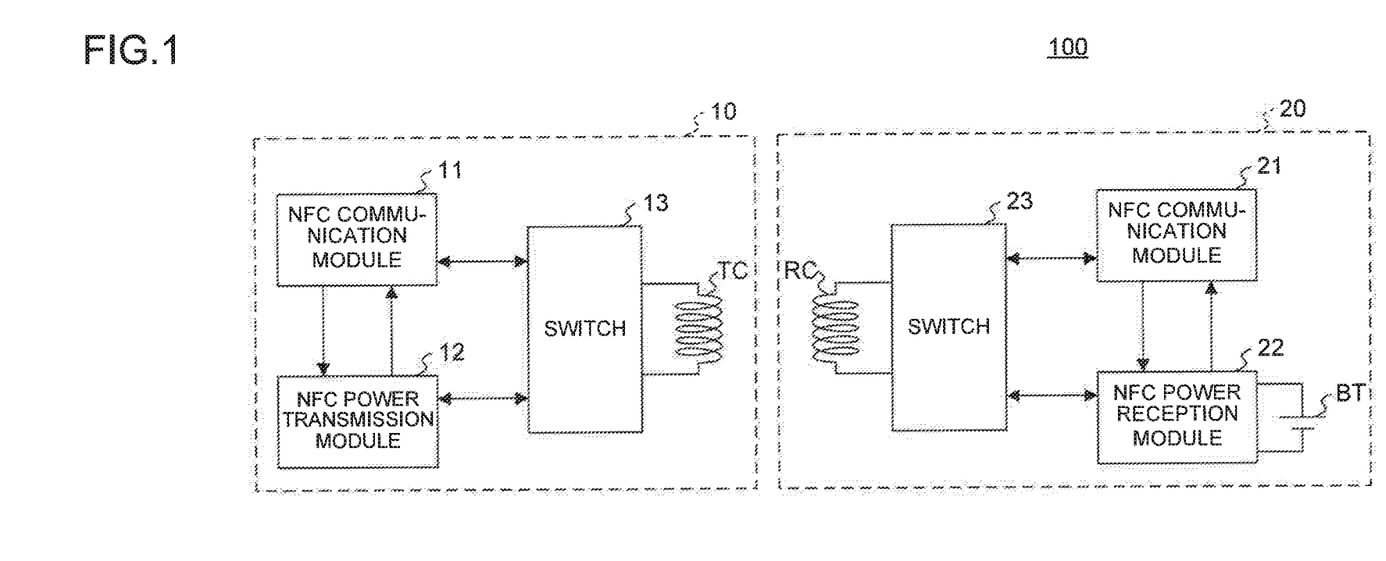
FIG. 1 is a block diagram showing a configuration of a power supply system.

FIG. 1 is a block diagram showing the configuration of a power supply system 100 according to the present invention. The power supply system 100 is constituted of a power transmission device 10 and a power reception device 20. The power transmission device 10 has a power transmission coil TC. The power reception device 20 has a power reception coil RC.

The power transmission device 10 and the power reception device 20 exchange information between the power transmission coil TC and the power reception coil RC by short range radio communications (hereinafter also called NFC (Near Field Communications)) using, for example, electromagnetic waves of 13.56 MHz. The power transmission device 10 and the power reception device 20 perform the information exchange by transmissions and receptions of information packets using, for example, Type-F packets, which are one type of NFC packet standards.

The power transmission device 10 and the power reception device 20 also perform power transmission and power reception in a non-contact manner between the power transmission coil TC and the power reception coil RC by, for example, electromagnetic field resonance. In the following description, the power transmission and the power reception are also collectively called power supply.

Since signals used for the power supply have larger amplitudes than signals for the information exchange, the information exchange cannot be performed while performing power supply. Therefore, the power transmission device 10 and the power reception device 20 perform the power supply and the information exchange in a switched manner.

The power supply is constituted of repetitions of transmission and reception of information packets related to the settings of the power supply (for example, transmission of a status parameter indicating the status of a battery BT of the power reception device 20) and subsequent short-time power transmission and reception. In the following description, a power transmission time for the single power transmission is referred to as a unit power transmission time. Note that, the unit power transmission time may be varied depending on variations in the voltage level of the battery BT of the power reception device 20.

The power transmission device 10 has an NFC communication module 11, an NFC power transmission module 12, a switch 13, and the power transmission coil TC.

The NFC communication module 11 transmits and receives information packets to and from another device (the power reception device 20 in this embodiment) situated near the power transmission device 10. The NFC communication module 11 transmits and receives information packets (hereinafter referred to as power transmission packets PP) related to the settings of the power supply, and transmits and receives general information packets (hereinafter referred to as general packets GP) other than the power transmission packets.

Figure 2:
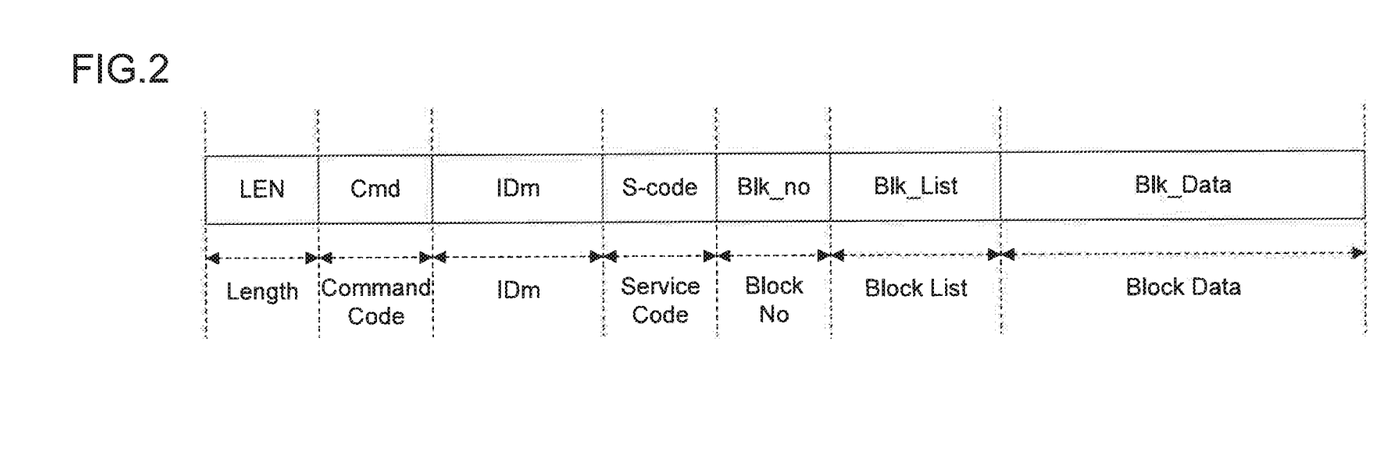
FIG. 2 is a drawing showing a configuration of a packet.

FIG. 2 shows the configuration of an information packet to be transmitted by the NFC communication module 11. "LEN" represents the length of the packet. "Cmd" (Command Code) represents the type of the packet. "IDm" represents an ID of a communication counterpart or partner device with which the NFC communication module 11 communicates.

"Blk_no" represents the number of blocks contained in the packet. One block corresponds to 16 bytes of data. "Blk_Data" is data to be written having a data size of "Blk_no"×16 bytes, in other words, an integral multiple of 16 bytes.

"Blk_List" represents address designation to designate a position (referred to as a block address) in a memory of the partner device (i.e., power reception device 20 in the embodiment) into which the block data contained in the packet is to be written.

Figure 3:
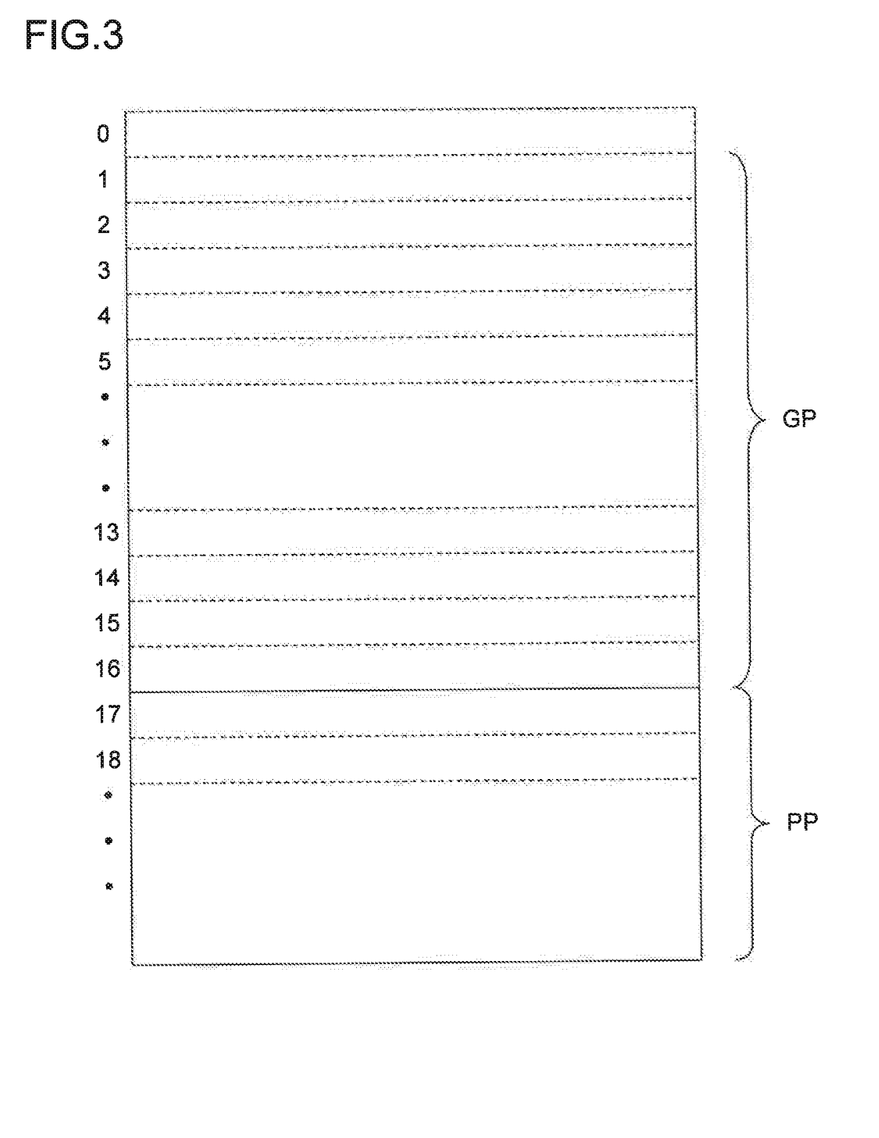
FIG. 3 is a drawing schematically showing a configuration of a memory.

FIG. 3 schematically shows the configuration of the memory and the block addresses. For example, when "1, 5, 7" are listed in the "Blk_List", a block address 1, a block address 5, and a block address 7 are designated as data write positions in the memory of the partner device.

Note that, a block address 0 represents the range of block addresses (i.e. a maximum address value) in the memory usable for transmitting and receiving general information packets. For example, when the maximum size of data to be processed in the memory is 256 bytes, since 1 block is constituted of 16 bytes, the maximum address value (i.e. the number of blocks) is "16". Thus, the block address 0 represents a value of "16", and a memory area having block addresses of 1 to 16 is used for transmission and reception of the general information packets. In the following description, a value represented by the block address 0 is referred to as "address delimitation value".

Referring to FIG. 1 again, the NFC communication module 11 transmits and receives certification packets, which are used for certification when starting power supply, ability check packets, which are used for checking whether or not the partner device is compliant with power supply by NFC, and the like to and from the partner device (i.e. the power reception device 20 in this embodiment).

The NFC communication module 11 transmits a status check packet to check the status of the battery of the power reception device 20, and receives a status parameter, which indicates the status of the battery, and a request parameter, which indicates the amount of transmission power required by the power reception device 20, transmitted from the power reception device 20 in response to the status check packet.

Furthermore, the NFC communication module 11 transmits an address range request signal to the power reception device 20 in order to make an inquiry about an address delimitation value (i.e. a value indicated by the block number 0). The NFC communication module 11 receives a response signal indicating the address delimitation value from the power reception device 20.

Figure 4:
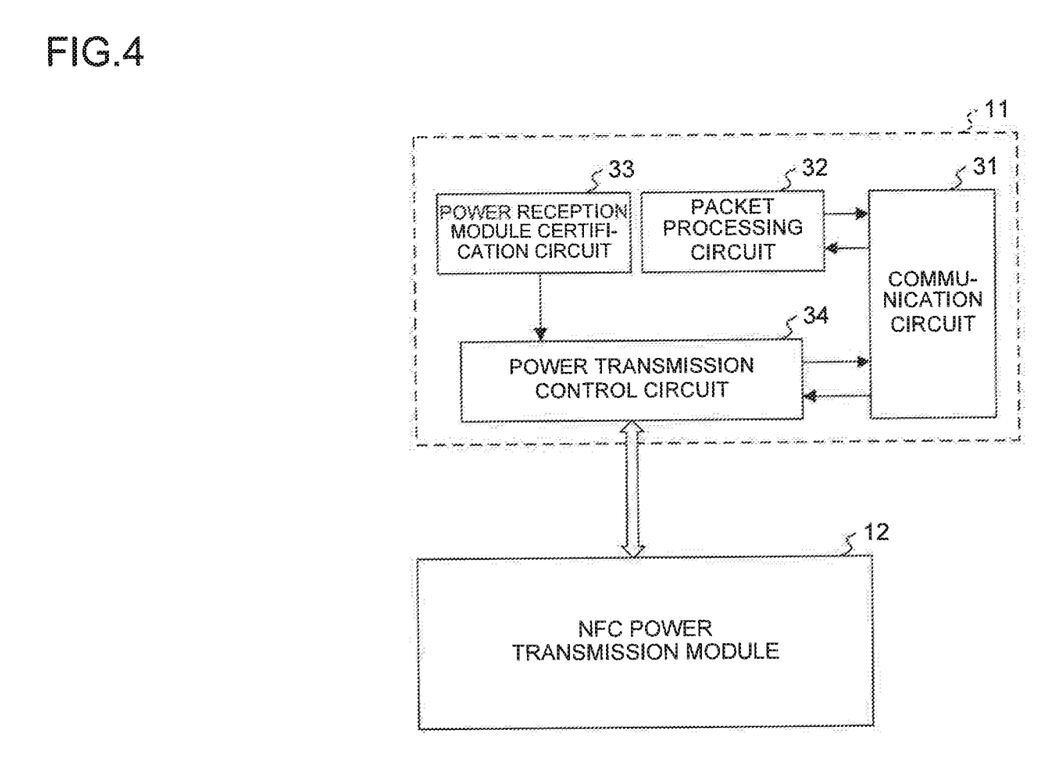
FIG. 4 is a block diagram showing a configuration of an NFC communication module for a power transmission device.

FIG. 4 is a block diagram showing the configuration of the NFC communication module 11. The NFC communication module 11 includes a communication circuit 31, a packet processing circuit 32, a power reception module certification circuit 33, and a power transmission control circuit 34.

The communication circuit 31 transmits and receives general packets GP and power transmission packets PP.

The packet processing circuit 32 provides the general packet GP and the power transmission packet PP with different block address designation (different values of "Blk_List" of FIG. 2), in order to make a distinction between the general packet GP and the power transmission packet PP.

To be more specific, the packet processing circuit 32 provides the general packet GP with address designation indicating a block address that is equal to or smaller than the address delimitation value (i.e. the value represented by the block address 0) received from the power reception device 20, while providing the power transmission packet PP with address designation indicating a block address that is larger than the address delimitation value. For example, when the address delimitation value is "16", the general packet GP is provided with any of block addresses 1 to 16 as the address designation. On the other hand, the power transmission packet PP is provided with any of block addresses of 17 or more as the address designation. A memory area (having addresses of 1 to 16) for processing the general packet GP is hereinafter referred to as a first memory area, while a memory area (having addresses of 17 or more) for processing the power transmission packet PP is hereinafter referred to as a second memory area.

The power reception module certification circuit 33 certifies the partner device, on the basis of a certification packet received by the communication circuit 31. The power reception module certification circuit 33 checks whether or not the partner device is compliant with power supply by NFC, on the basis of an ability check packet received by the communication circuit 31.

The power transmission control circuit 34 sets a power transmission parameter on the basis of a status parameter and a request parameter received by the communication circuit 31. The power transmission parameter includes, for example, information on a unit power transmission time (transmission time of each power transmission) and the amount of power to be transmitted by the NFC power transmission module 12. The power transmission control circuit 34 commands the NFC power transmission module 12 to perform power transmission in accordance with the set power transmission parameter. It is noted that the NFC power transmission module 12 performs the power transmission for the unit power transmission time in accordance with the set power transmission parameter, and thereafter the NFC power transmission module 12 repeats power transmission whenever a new power transmission parameter is set by transmission and reception of a status check packet, a status parameter and a request parameter.

Referring to FIG. 1 again, the NFC power transmission module 12 performs power transmission in accordance with a power transmission parameter under control of the power transmission control circuit 34.

The switch 13 switches between the NFC communication module 11 and the NFC power transmission module 12 to connect one of the NFC communication module 11 and the NFC power transmission module 12 to the power transmission coil TC, in accordance with whether to perform transmission and reception of information packets to and from the power reception device 20 or to perform power transmission to the power reception device 20.

Figure 5:
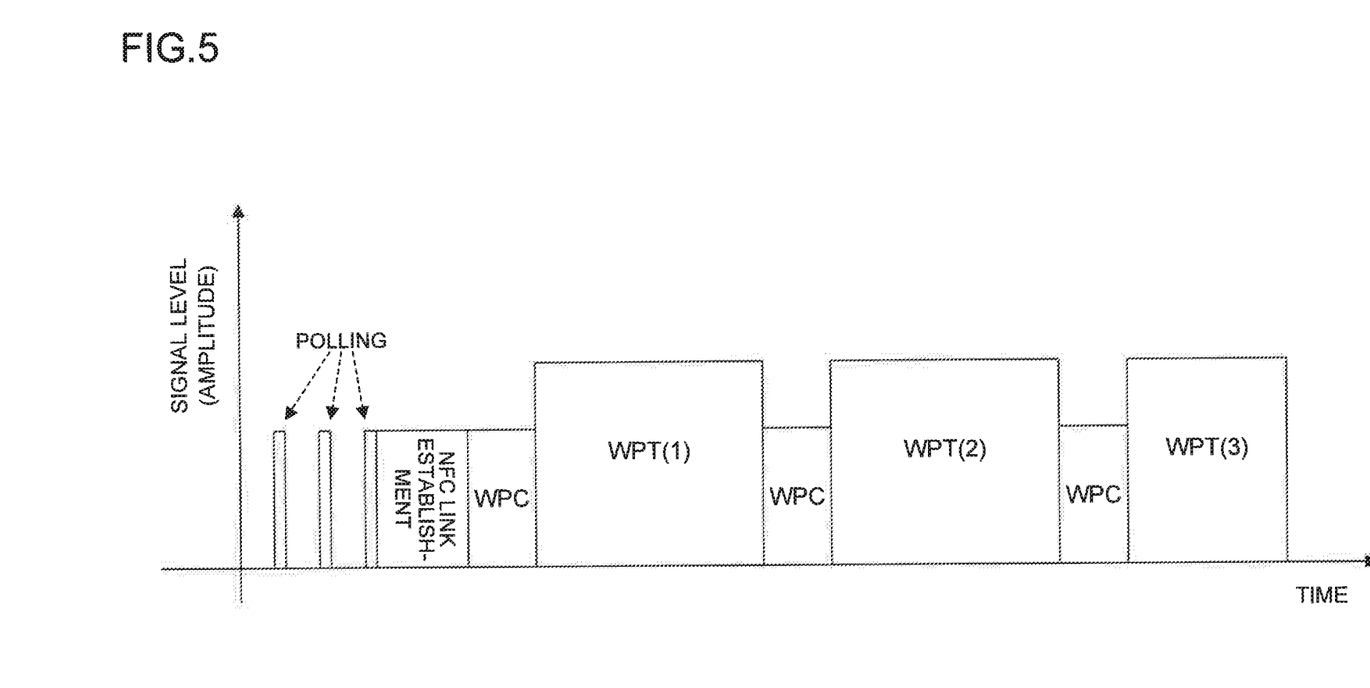
FIG. 5 is a graph showing an overview of signals during power transmissions.

FIG. 5 is a graph of an overview of signals to be transmitted when the power transmission device 10 performs power transmission. The communication circuit 31 of the NFC communication module 11 first makes inquiries to peripheral devices by transmitting and receiving polling packets to confirm the existence of the power reception device 20. The NFC communication module 11 transmits and receives certification packets and ability check packets to and from the power reception device 20, and establishes connection of short range radio communications with the power reception device 20 (indicated by "NFC link establishment" in the drawing). The NFC communication module 11 transmits a status check packet to the power reception device 20, and receives a power transmission packet PP including a status parameter and a request parameter from the power reception device 20 (indicated by "WPC" in the drawing). The NFC communication module 11 sets a power transmission parameter in accordance with the status parameter and the request parameter, and the NFC power transmission module 12 performs power transmission in accordance with the set power transmission parameter (indicated by "WPT(1)" in the drawing). Whenever the NFC communication module 11 transmits a status check packet and receives a status parameter and a request parameter, the NFC power transmission module 12 performs power transmission in a repeated manner (indicated by "WPT(2)" and "WPT(3)" in the drawing).

Referring to FIG. 1 again, the power reception device 20 includes an NFC communication module 21, an NFC power reception module 22, a switch 23, the power reception coil RC, and the battery BT.

The switch 23 switches between the NFC communication module 21 and the NFC power reception module 22 to connect one of the NFC communication module 21 and the NFC power reception module 22 to the power reception coil RC, depending on whether transmission and reception of information packets to and from the power transmission device 10 or power reception from the power transmission device 10 is to be performed.

The NFC communication module 21 transmits and receives information packets to and from another device (i.e., the power transmission device 10 in this embodiment) situated near the power reception device 20. The NFC communication module 21 transmits and receives power transmission packets PP, as well as general packets GP.

Figure 6:
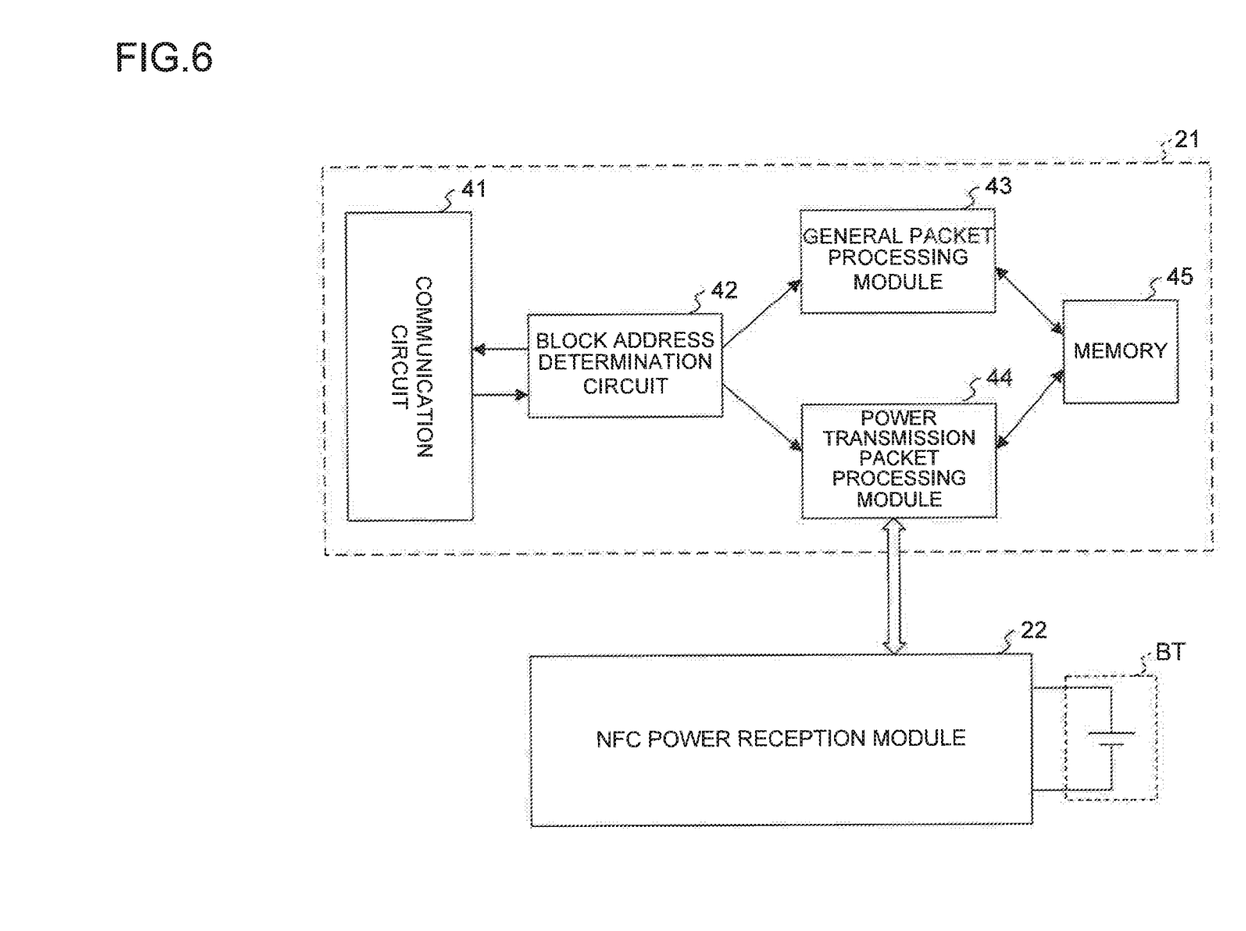
FIG. 6 is a block diagram showing a configuration of an NFC communication module for a power reception device.

FIG. 6 is a block diagram showing the configuration of the NFC communication module 21. The NFC communication module 21 includes a communication circuit 41, a block address determination circuit 42, a general packet processing module 43, a power transmission packet processing module 44, and a memory 45.

The communication circuit 41 transmits and receives general packets GP and power transmission packets PP.

The block address determination circuit 42 determines whether an information packet transmitted from the power transmission device 10 is a general packet GP or a power transmission packet PP on the basis of address designation (a block address) provided to the information packet. The block address determination circuit 42 supplies the information packet to the general packet processing module 43 or the power transmission packet processing module 44 on the basis of the determination result. To be more specific, when the address designation of the information packet is equal to or smaller than an address delimitation value, the block address determination circuit 42 determines that the information packet is a general packet GP, and supplies the information packet to the general packet processing module 43. On the other hand, when the address designation of the information packet is larger than the address delimitation value, the block address determination circuit 42 determines that the information packet is a power transmission packet PP, and supplies the information packet to the power transmission packet processing module 44.

The general packet processing module 43 processes the general packet GP using the first memory area (i.e. an area having block addresses equal to or smaller than the address delimitation value) of the memory 45. For example, when the address delimitation value is "16", an area having block addresses of 1 to 16, which is indicated with "GP" in FIG. 3, is designated as the first memory area.

The power transmission packet processing module 44 processes the power transmission packet PP using the second memory area (i.e. an area having block addresses larger than the address delimitation value) of the memory 45. For example, when the address delimitation value is "16", an area having block addresses of 17 or more, which is indicated with "PP" in FIG. 3, is designated as the second memory area.

As described above, the power transmission device 10 according to this embodiment provides the information packets with the address designation to designate the different memory areas between the general packets GP and the power transmission packets PP, on the basis of the address delimitation value (the value represented by the block address 0) of the memory 45 of the power reception device 20, and thereafter transmits and receives the information packets.

Therefore, the power reception device 20 can determine whether the information packet transmitted from the power transmission device 10 is the general packet GP or the power transmission packet PP, at the time of receiving the information packet. Thus, it is possible to easily make a distinction of the information packet with the simple configuration.

In the power supply system 100 according to this embodiment, the first memory area and the second memory area are established using the address delimitation value that represents the maximum address value (e.g. "16") of the memory used for the transmission and reception of general information packets. Therefore, even when a conventional short range radio communication device that is not compliant with the power supply of this embodiment accesses the power transmission device 10 and the power reception device 20 according to the present invention, no power transmission packet PP can be wrongly transmitted and received owing to the limitations imposed by the address delimitation value.

The power reception device 20 can make a distinction between the general packet GP and the power transmission packet PP, and therefore even when a general packet GP is inserted during transmission and reception of power transmission packets PP, the general packet GP and the power transmission packets PP can be processed without having effect on a power transmission sequence. Thus, the power transmission can be continued except for time required for processing the information packets.

Accordingly, the power supply system 100 according to this embodiment allows information exchange without a reduction in power transmission efficiency.

Second Embodiment

A power supply system according to this embodiment is different from the power supply system 100 of the first embodiment in terms of the configuration of the NFC communication module 21 of the power reception device 20.

Figure 7:
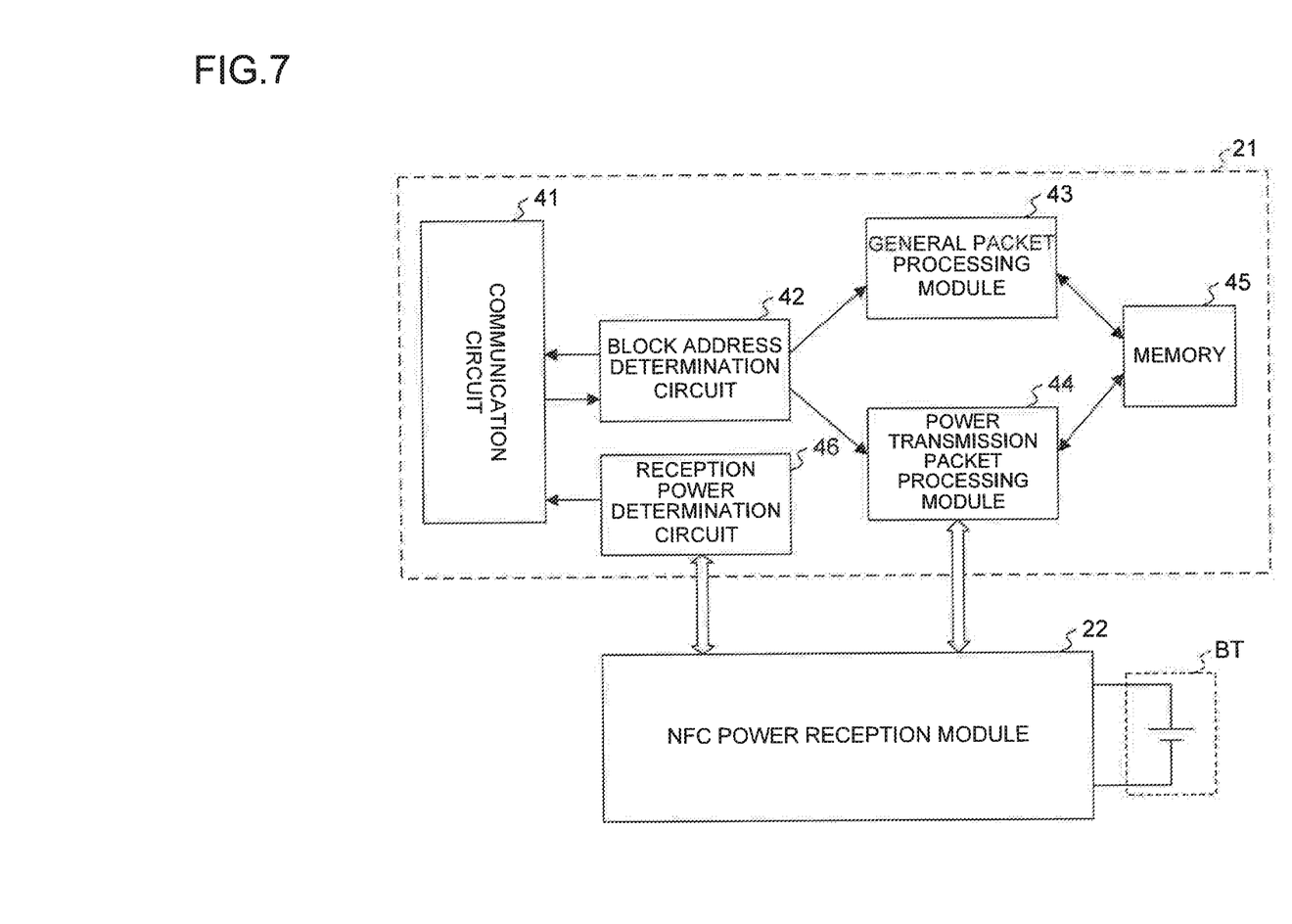
FIG. 7 is a block diagram showing a configuration of an NFC communication module for a power reception device according to a second embodiment.

FIG. 7 is a block diagram showing the configuration of an NFC communication module 21 according to this embodiment. The NFC communication module 21 according to this embodiment includes a reception power determination circuit 46, in addition to the same components (i.e. the communication circuit 41, the block address determination circuit 42, the general packet processing module 43, the power transmission packet processing module 44, and the memory 45) as those of the NFC communication module 21 of the first embodiment.

The reception power determination circuit 46 determines the level of power received by the NFC power reception module 22, and determines on the basis of the determination result whether the power transmission device 10 is in the middle of performing power transmission (in other words, is continuing the power transmission) or not (in other words, is suspending the power transmission). For example, when the received power level is lower than a certain voltage threshold value, the reception power determination circuit 46 determines that no power transmission is being performed. Upon the determination of no power transmission, the reception power determination circuit 46 provides the switch 23 with the determination result. In response thereto, the switch 23 connects the NFC communication module 21 to the power reception coil RC by switching. Thus, the power reception device 20 is switched from a power reception state (or a power reception mode) to an information packet transmission and reception state (or a communication mode).

Figure 8:
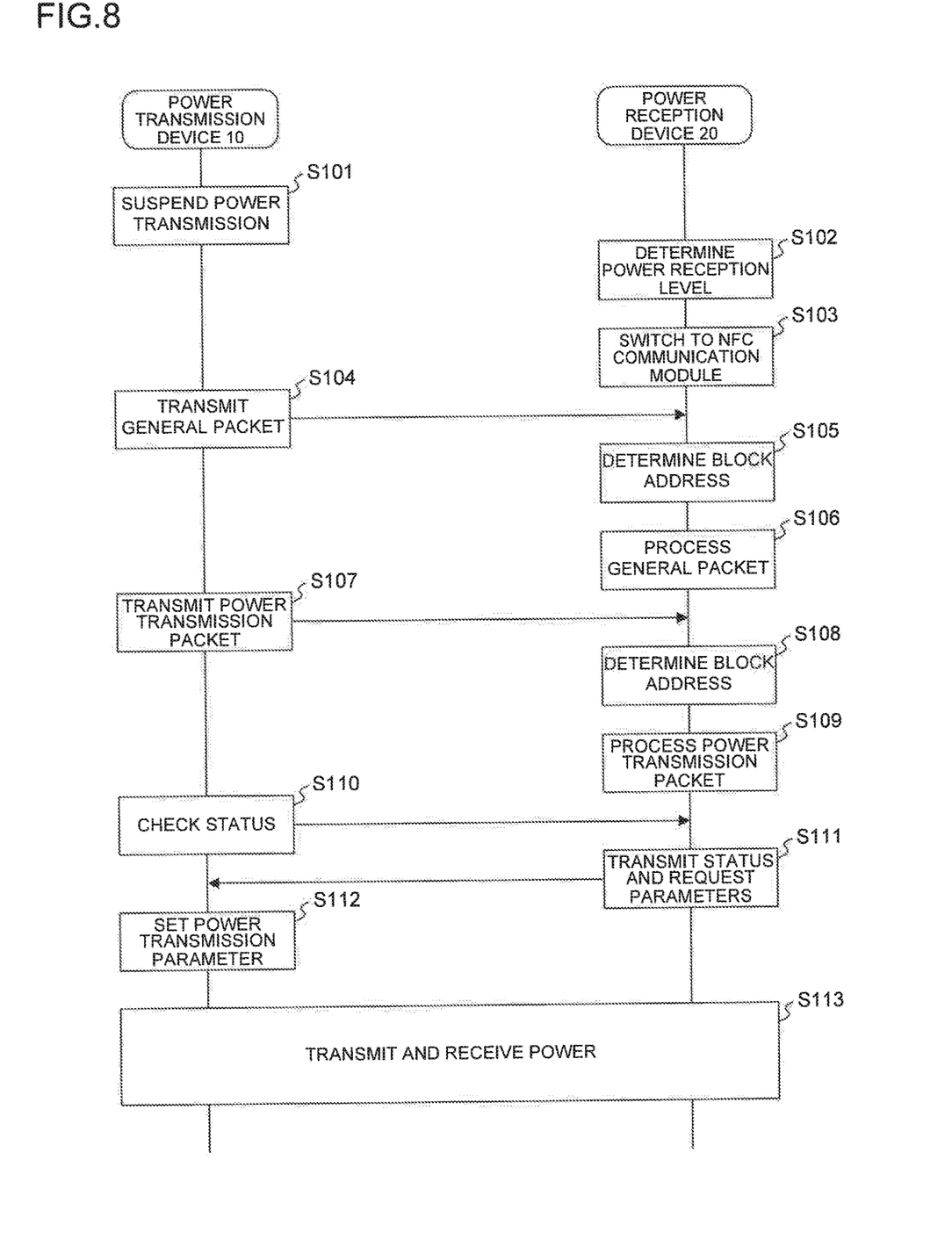
FIG. 8 is a sequence diagram of processing operation when transmitting and receiving information packets after suspending a power transmission in the second embodiment.

Next, the operation of the power transmission device 10 and the power reception device 20, when the power transmission device 10 suspends power transmission and transmits a general packet GP, will be described with reference to a sequence diagram of FIG. 8.

The power transmission device 10 suspends power transmission (step S101). The reception power determination circuit 46 of the power reception device 20 determines that the level of power received by the NFC power reception module 22 is lower than a voltage threshold value (step S102). The switch 23 switches from the NFC power reception module 22 to the NFC communication module 21, to connect the power reception coil RC to the NFC communication module 21 (step S103).

The NFC communication module 11 of the power transmission device 10 transmits a general packet GP that has address designation indicating a block address equal to or smaller than an address delimitation value (step S104). The NFC communication module 21 of the power reception device 20 receives the general packet GP. The block address determination circuit 42 determines that the received packet is a general packet GP on the basis of the address designation of the received information packet (step S105). The general packet processing module 43 processes the general packet GP using a first memory area (an area having block addresses equal to or smaller than the address delimitation value) of the memory 45 (step S106).

Upon completing the transmission (or reception) of the necessary general packet GP, the power transmission device 10 transmits a power transmission packet PP (step S107). The NFC communication module 21 of the power reception device 20 receives the power transmission packet PP. The block address determination circuit 42 determines that the received packet is a power transmission packet PP on the basis of address designation provided to the received information packet (step S108). The power transmission packet processing module 44 processes the power transmission packet PP using a second memory area (an area having block addresses larger than the address delimitation value) of the memory 45 (step S109).

The power transmission device 10 transmits a status check packet to check the status of the battery BT of the power reception device 20 (step S110). In response to the status check packet transmitted from the power transmission device 10, the power reception device 20 transmits a status parameter and a request parameter (step S111).

The power transmission device 10 receives the status parameter and the request parameter, and sets a power transmission parameter on the basis of these parameters (step S112). The power transmission device 10 transmits power in accordance with the set power transmission parameter. The power reception device 20 charges the battery BT with the power received thereby (step S113).

As described above, according to the power supply system 100 of the embodiment, since the power reception device 20 shifts to the information packet transmission and reception state immediately after suspending the power transmission, the power transmission device 10 and the power reception device 20 quickly start the transmission and reception of the information packets. Especially when the transmission and reception of the general packets GP are required during the power transmission, it becomes possible to transmit and receive the general packets GP without waiting for completion of one period of the power transmission (the power transmission of the unit power transmission time).

Note that, the present invention is not limited to the above embodiments. The above embodiments describe a case where the power supply is performed by electromagnetic field resonance. However, a method for the power supply is not limited thereto, and another method such as an electromagnetic induction method may be used instead.

In the above embodiments, the transmission and reception of the information packets are performed using the Type-F packets, which are one type of NFC packet standards, and the information packets have configuration as shown in FIG. 2. However, the information packets may be transmitted and received in accordance with other NFC communication standards, and may have configuration other than FIG. 2. The present invention is applicable to another communication method in which the information packets can be provided with the address designation on the basis of the address configuration of the memory of the power reception device.

This application is based on a Japanese Patent Application No. 2016-164419 which is hereby incorporated by reference.

What is claimed is:

1. A power transmission device comprising a power transmission coil, the power transmission device performing transmission and reception of information packets to and from a power reception device having a power reception coil and a memory, while switching between the transmission and reception of the information packets, the power transmission device comprising:
   a communication circuit configured to transmit and receive a power transmission packet, the power transmission packet being an information packet related to settings of a power transmission, and a general packet, the general packet being an information packet other than the power transmission packet, to and from the power reception device; and
   a power transmission circuit configured to perform the power transmission after the transmission and reception of the power transmission packet, wherein
   the communication circuit
      receives address information indicating an address configuration of the memory from the power reception device,
      provides the general packet with an address designation indicating a first memory area of the memory, and provides the power transmission packet with another address designation indicating a second memory area of the memory, on a basis of the address information, and transmits the general packet and the power transmission packet having, respectively, the address designation and the other address destination to the power reception device.

2. The power transmission device according to claim 1, wherein the address information includes information about a maximum address value of the memory, the power reception device being configured to use the memory for transmission and reception of the general packet, and the communication circuit establishes the first memory area and the second memory area on a basis of the information about the maximum address value.

3. A power reception device comprising a power reception coil and a memory, the power reception device performing transmission and reception of information packets to and from a power transmission device having a power transmission coil, while switching between the transmission and reception of the information packets, in order to charge a battery with received power, the power reception device comprising:

a communication circuit configured to receive an information packet from the power transmission device;

a packet processing circuit configured to process the received information packet in a memory area of the memory;

a power reception circuit configured to receive power and to charge the battery with the received power; and a switch for switching between the communication circuit and the power reception circuit, to connect the power reception coil to one of the communication circuit and the power reception circuit, wherein the communication circuit transmits address information indicating an address configuration of the memory to the power transmission device, the packet processing circuit makes a distinction in the information packet between a power transmission packet, the power transmission packet being an information packet related to settings of a power transmission from the power transmission device, and a general packet, the general packet being an information packet other than the power transmission packet, on a basis of an address designation provided to the information packet, and the packet processing circuit processes the general packet in a first memory area of the memory, and processes the power transmission packet in a second memory area of the memory.

4. The power reception device according to claim 3, comprising a reception power determination circuit for determining whether the power transmission from the power transmission device is suspended or not on a basis of a power value of the received power, wherein when it is determined that the power transmission is suspended, the switch connects the power reception coil to the communication circuit.

5. A power supply system comprising a power transmission device having a power transmission coil and a power reception device having a power reception coil and a memory, the power supply system performing transmission and reception of information packets between the power transmission coil and the power reception coil, while switching between the transmission and reception of the information packets, wherein the power transmission device includes:
  a power transmission side communication circuit configured to perform the transmission and reception of the information packets; and
  a power transmission circuit configured to perform the power supply,
the power reception device includes:
  a power reception side communication circuit configured to perform the transmission and reception of the information packets;
  a packet processing circuit configured to process an information packet in a memory area of the memory; and
  a power reception circuit configured to charge a battery with power received from the power transmission device,
the power reception side communication circuit of the power reception device transmits address information indicating an address configuration of the memory to the power transmission device,
the power transmission side communication circuit of the power transmission device provides a power transmission packet, the power transmission packet being an information packet related to settings of a power transmission, with an address designation to designate a second memory area of the memory, and provides a general packet, the general packet being an information packet other than the power transmission packet, with another address designation to designate a first memory area of the memory, on a basis of the address information, and
the packet processing circuit of the power reception device makes a distinction of the information packet received by the power reception side communication circuit between the power transmission packet and the general packet on a basis of the address designation or the other address destination, and processes the general packet in the first memory area and processes the power transmission packet in the second memory area.

6. A power transmission method for a power transmission device that includes a power transmission coil, a communication circuit, and a power transmission circuit, the power transmission device performing transmission and reception of information packets to and from a power reception device having a power reception coil and a memory, while switching between the transmission and reception of the information packets, wherein the communication circuit performs the steps of:
  receiving address information indicating an address configuration of the memory from the power reception device;
  providing a power transmission packet, the power transmission packet being an information packet related to the settings of a power transmission, with an address designation to designate a second memory area of the memory, and providing a general packet, the general packet being an information packet other than the power transmission packet, with another address designation to designate a first memory area of the memory, on a basis of the address information; and transmitting the general packet and the power transmission packet having the address designation or the other address destination to the power reception device, and the power transmission circuit performs the step of performing the power transmission, after the transmission and reception of the power transmission packets.

\* \* \* \* \*